United States Patent [19]

Kinney et al.

[11] 4,396,350

[45] Aug. 2, 1983

[54] PUMP ISOLATION VALVE

[76] Inventors: Calvin L. Kinney, Penn Hills; Todd M. Wetherill, Lower Burrell, both of Pa., granted to U.S. Department of Energy under the provisions of 42 U.S.C. 2182

[21] Appl. No.: 219,719

[22] Filed: Dec. 24, 1980

[51] Int. Cl.³ ............................ F03B 3/18; F03B 3/00
[52] U.S. Cl. ................................................... 415/150
[58] Field of Search ............... 415/157, 158, 150, 148; 376/281, 402, 404; 417/360

[56] References Cited

U.S. PATENT DOCUMENTS

| | | | |
|---|---|---|---|
| 3,404,631 | 10/1968 | Nixon . | |
| 3,433,145 | 3/1969 | Daly et al. | 415/148 X |
| 4,036,561 | 7/1977 | Harand et al. | 417/214 X |
| 4,188,173 | 2/1980 | Lindsay . | |
| 4,224,363 | 9/1980 | Vernonesi et al. | 417/360 |
| 4,298,088 | 11/1981 | Keller | 415/219 A X |
| 4,302,296 | 11/1981 | Sharbaugh et al. | 376/404 X |

FOREIGN PATENT DOCUMENTS 2641169  3/1977  Fed. Rep. of Germany ...... 415/148

Primary Examiner—William L. Freeh
Attorney, Agent, or Firm—L. A. DePaul

[57] ABSTRACT

The pump isolation valve provides a means by which the pump may be selectively isolated from the remainder of the coolant system while being compatible with the internal hydraulic arrangement of the pump during normal operation of the pump. The valve comprises a valve cylinder disposed around the pump and adjacent to the last pump diffuser with a turning vane attached to the lower end of the valve cylinder in a manner so as to hydraulically match with the discharge diffuser. The valve cylinder is connected to a drive means for sliding the valve cylinder relative to the diffuser support cylinder so as to block flow in either direction through the discharge diffuser when the valve is in the closed position and to aid in the flow of the coolant from the discharge diffuser by means of the turning vane when the valve is in the open position.

5 Claims, 6 Drawing Figures

PUMP ISOLATION VALVE

BACKGROUND OF THE INVENTION

This invention relates to pumps having isolation valves and more particularly to pumps having integral diffuser-isolation valves.

In a nuclear reactor power plant, the nuclear reactor generates heat which is transferred from the reactor coolant to a location remote from the nuclear reactor for the generation of steam and electricity in a conventional manner. In order to circulate the reactor coolant through the system, reactor coolant pumps are located in the reactor coolant circulatory system for pumping the reactor coolant through the system. Typically these reactor coolant pumps comprise a vertical pump with an electric motor vertically mounted on the pump by means of a motor stand. The rotation of the motor's drive shaft causes the pump's shaft to rotate, which causes the pump to circulate the reactor coolant through the reactor system in a manner well-known to those skilled in the art.

In many commonly known nuclear steam supply systems, there are a plurality of reactor coolant pumps disposed in fluid communication with the nuclear reactor vessel. This may be accomplished by either a loop-type arrangement or a pool-type arrangement as is commonly understood in the art. During reactor operation, the coolant pumps simultaneously pump reactor coolant through the nuclear reactor core where the reactor coolant passes in heat transfer relationship with the fuel assemblies therein. From this common pool of reactor coolant, the reactor coolant exits the reactor core and passes into the remainder of the reactor system. While the plurality of reactor coolant pumps function cooperatively under normal reactor conditions, under abnormal conditions, the interconnection of the reactor coolant pumps may result in damage to the system.

One such abnormal condition that may result in damage to the system is the failure of one of the coolant pumps while the other coolant pumps remain operating. In this situation, the operating coolant pumps may cause reactor coolant to be conducted through the non-operating pump in the reverse direction of its normal flow. In addition, it is necessary to be able to isolate a particular reactor coolant pump from the remainder of the operating system when the plant is operating at partial load to prevent coolant pressure loss associated with reverse flow through an idle pump. Although prevention of reverse flow through the non-operating coolant pump when the other pumps are operating is important, it is not the only consideration. Another important consideration is that in the event all pumps fail simultaneously such as in an electrical power failure, the path of the reactor coolant must remain open to allow natural circulation of the reactor coolant through the reactor core to facilitate cooling of the reactor core.

One device known to prevent reverse flow when one coolant pump is non-operational and to allow natural circulation when all cooled pumps are non-operational is a type of swing valve that is placed in the piping network between the coolant pump and the reactor core. This type of valve consists of a substantially circular metal flap attached by a hinge arrangement to the inside of a horizontal segment of piping such that under reverse flow the metal flap pivots about the hinge into an acute angle with respect to the hinge, thus blocking the flow path. However, when all coolant pumps are not operating, the metal flap hangs from the hinge in a substantially vertical attitude without contacting the side of the pipe opposite the hinge, thereby allowing natural circulation through the primary loop by allowing coolant to flow between the metal flap and the side of the pipe opposite the hinge because the natural circulatory flow is not sufficient to force the metal flap into the acute angle necessary to block the flow. While this device does solve some of the reverse flow problems, it creates additional problems in that the metal-hinge flap attachment creates a wearing surface and a surface susceptible to self-welding under high temperature coolants which thereby demand frequent maintenance attention.

There are many check valves in the art that allow flow in both directions under appropriate conditions. These check valves generally consist of a float member having a first end manufactured to conform to the shape of a valve seat and having a second end formed in a winged configuration capable of spanning a valve opening, opposite the valve seat, for allowing flow through the valve opening and between the winged configuration. Under normal conditions, a fluid is allowed to flow through the valve by passing through the winged configuration; however, under certain pressure conditions the first end of the flow member is forced against the valve seat thereby preventing flow through the valve. While these valves do perform necessary functions, they are not capable of being positively actuated to selectively prevent flow of reactor coolant therethrough.

Ideally, a reactor coolant pump must have a valve that is capable of selectively shutting off flow in either direction. Furthermore, to provide natural circulation through the reactor system, the valve should introduce a minimal discharge pressure drop when in the open position. Also, the valve should not hinder pump related functions or significantly reduce pump efficiency in its operating range. Therefore, what is needed is a pump having a valve that is capable of selectively isolating the pump from the remainder of the coolant system in a manner that does not reduce the pump efficiency when the pump is operating normally.

SUMMARY OF THE INVENTION

The pump isolation valve provides a means by which the pump may be selectively isolated from the remainder of the coolant system while being compatible with the internal hydraulic arrangement of the pump during normal operation of the pump. The valve comprises a valve cylinder disposed around the pump and adjacent to the last pump diffuser with a turning vane attached to the lower end of the valve cylinder in a manner so as to hydraulically match with the discharge diffuser. The valve cylinder is connected to a drive means for sliding the valve cylinder relative to the diffuser support cylinder so as to block flow in either direction through the discharge diffuser when the valve is in the closed position and to aid in the flow of the coolant from the discharge diffuser by means of the turning vane when the valve is in the open position.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

In both the pool-type and loop-type nuclear reactor systems, it is sometimes necessary to isolate the reactor coolant pumps from the remainder of the reactor coolant system. The invention described herein provides a means by which a reactor coolant pump can be selectively isolated from the remainder of the reactor coolant system while not detracting from the hydraulic operation of the pump when the valve is in the open position.

Figure 1:
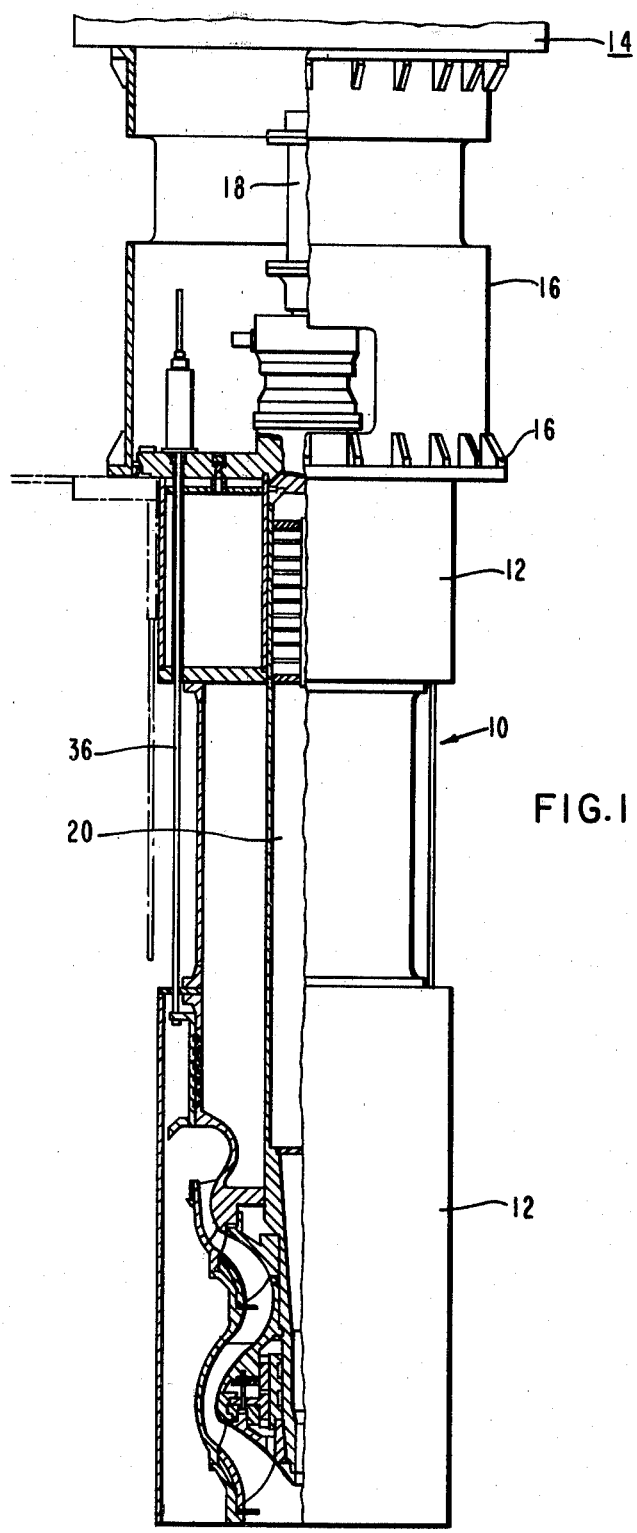
FIG. 1 is a cross-sectional view in elevation of the pump.

Referring now to FIG. 1, the reactor coolant pump is referred to generally as 10 and comprises a pump section 12 and a motor section 14 mounted on motor stand 16 of pump section 12. Motor 14 is connected to pump 12 by means of coupling 18 in such a manner that the rotation of motor 14 causes pump shaft 20 to similarly rotate, thereby pumping reactor coolant through the reactor coolant system.

Figure 2:
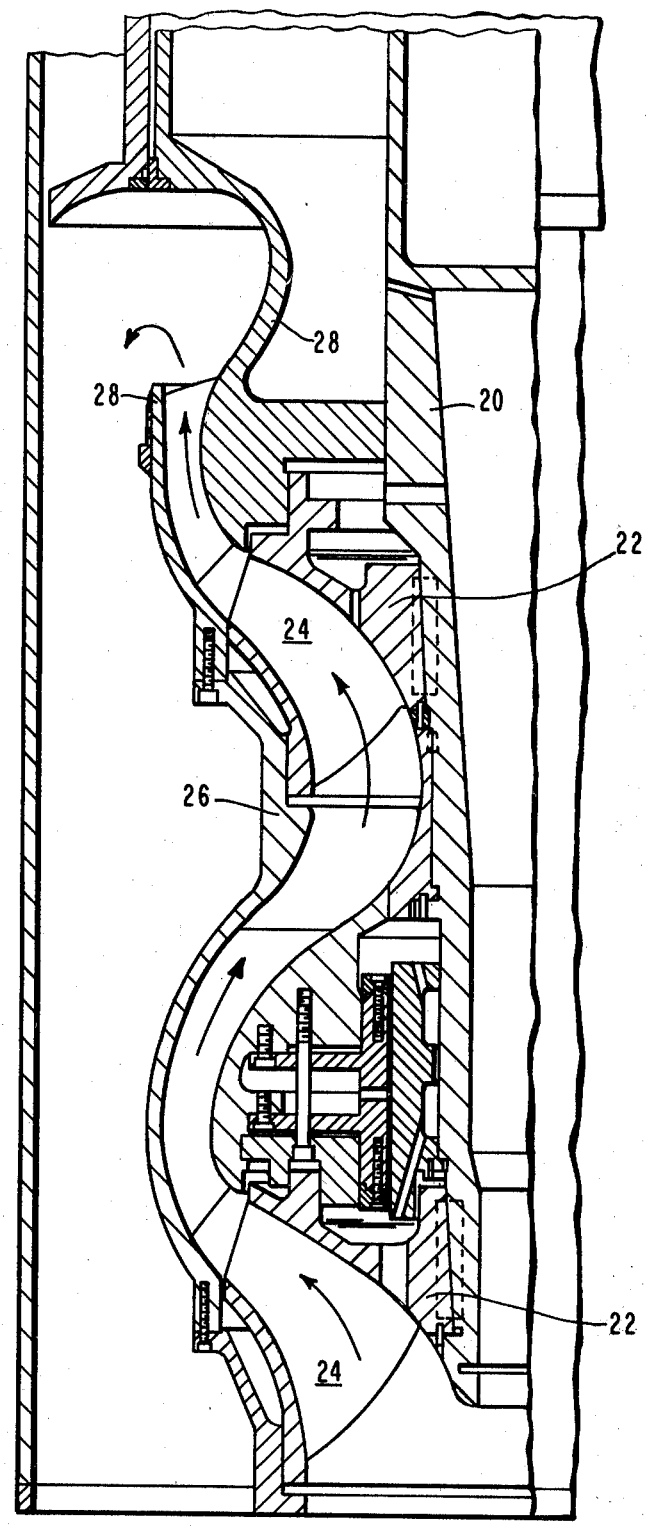
FIG. 2 is a cross-sectional view in elevation of the discharge region of the pump.

Referring now to FIG. 2, a plurality of impellers 22 are attached to pump shaft 20 in a manner well understood in the art. Each impeller 22 has a vane 24 attached thereto for pumping the reactor coolant which may be a liquid metal through pump 10 under the rotation of pump shaft 20. A diffuser 26 is cooperatively arranged with respect to vanes 24 and impellers 22 for conducting the reactor coolant through the pump as is well understood in the pump art. When reactor coolant pump 10 is operating, the reactor coolant flows through the pump as illustrated by the arrows in FIG. 2 and is discharged through discharge diffuser 28.

Figures 3, 4:
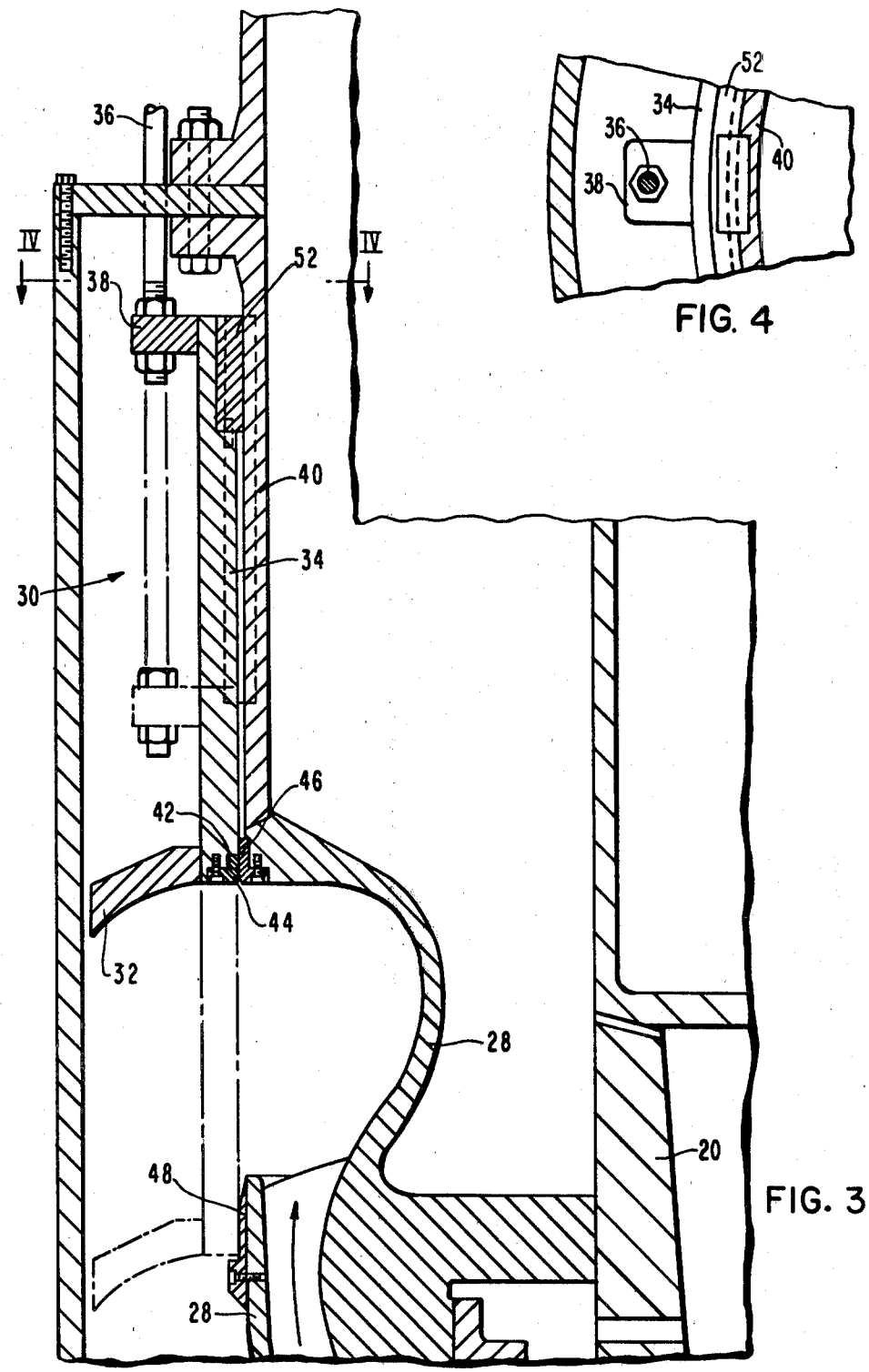
FIG. 3 is a cross-sectional view in elevation of the isolation valve.
FIG. 4 is the view along line IV—IV of FIG. 3.

Referring now to FIG. 3, the isolation valve is referred to generally as 30 and comprises a turning vane 32 attached to valve cylinder 34 which is attached to lifting rod 36 by means of lifting rod bracket 38. Turning vane 32 consists of a metal member shaped to conform to the shape of discharge diffuser 28 so as to direct the flow of the reactor coolant flowing from discharge diffuser 28 in a non-turbulent manner when isolation valve 30 is open. Turning vane 32 is attached to valve cylinder 34 and extends around the circumference of pump 10. Valve cylinder 34 is a substantially cylindrical metal member that is slidably disposed around the outer circumference of diffuser support cylinder 40. A piston ring 42 which may be a segmented, spring loaded element is disposed in a notch on valve cylinder 34 and is attached thereto by means of piston ring holder 44. Similarly, a piston ring seat 46 which may be a hard faced member is attached to discharge diffuser 28. A discharge valve seat 48 which may be a hard-faced member is bolted to the outer end of discharge diffuser 28 as shown in FIG. 3.

Referring now to FIGS. 3 and 4, a plurality of rectangular keys 50 are bolted to diffuser support cylinder 40 and are symmetrically spaced about diffuser support cylinder 40. Valve cylinder 34 has a similar number of keyways therein that are arranged to accommodate keys 50. Valve cylinder 34 is slidably disposed over keys 50 so as to allow valve cylinder 34 to slide upwardly and downwardly along diffuser support cylinder 40 and along keys 50. However, keys 50 prevent rotation of valve cylinder 34 with respect to diffuser support cylinder 40 which thereby enhances the mating of the valve seats. The number of lifting rods 36 is chosen to correspond to the number of keys 50 and are arranged in the same vertical plane as keys 50, which further provides for ease in sliding valve cylinder 34 with respect to diffuser support cylinder 40. A substantially cylindrical labyrinth seal insert 52 is bolted to the upper end of valve cylinder 34 and has a multiplicity of grooves on the side thereof that faces diffuser support cylinder 40. Labyrinth seal insert 52 may be manufactured from similar material as valve cylinder 34 and provides a sliding surface between labyrinth seal insert 52 and diffuser support cylinder 40 while limiting the flow of any fluid therebetween. Labyrinth seal insert 52 has a plurality of notches therein that correspond to the keyways in valve cylinder 34 for accommodating keys 50.

Figure 5:
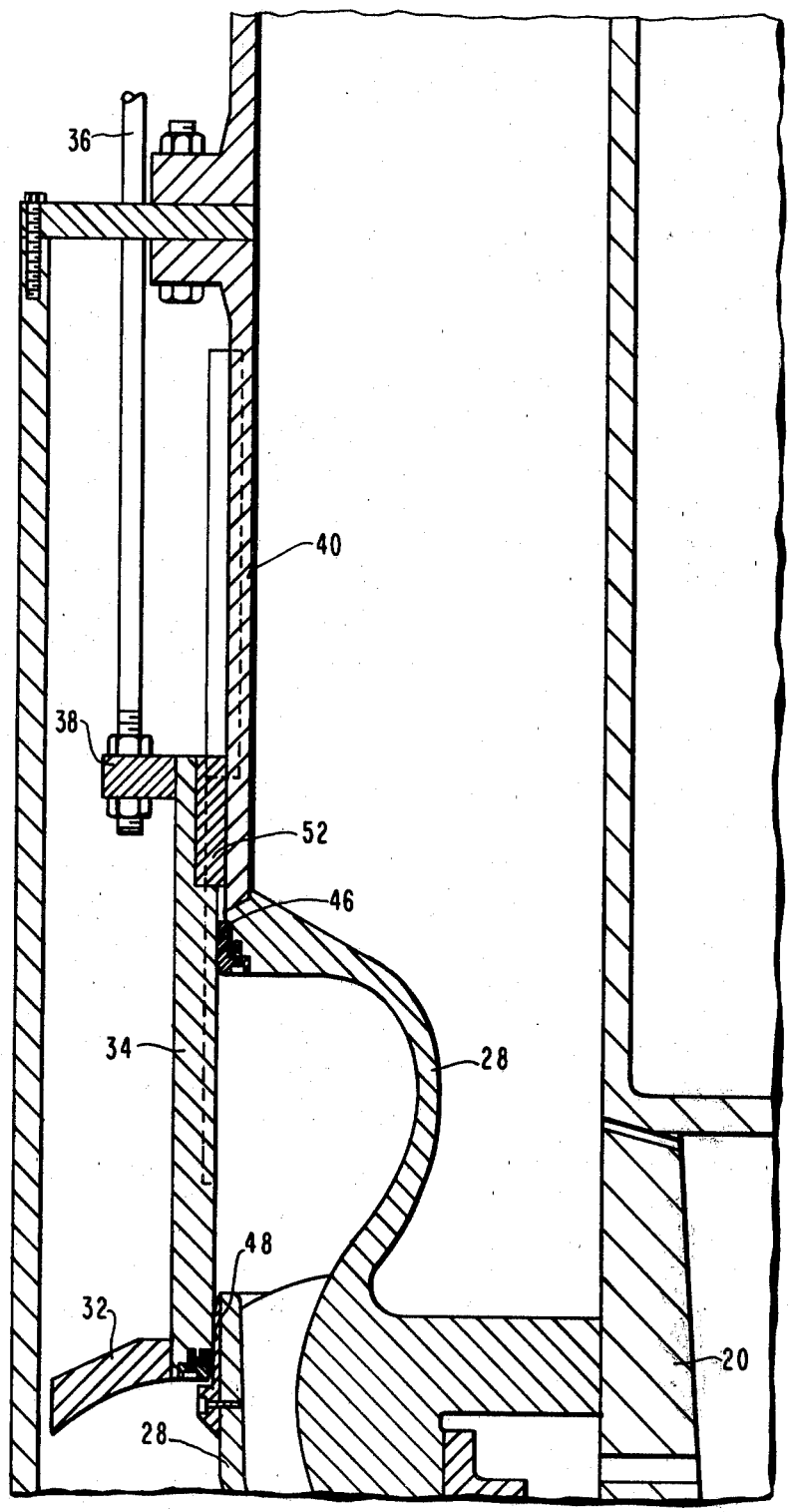
FIG. 5 is a cross-sectional view in elevation of the isolation valve in the closed position.

With isolation valve 30 in the open position as shown in FIG. 3 and with reactor coolant pump 10 operating, the reactor coolant is pumped through discharge diffuser 28 and is directed by turning vane 32 to the pump outlet. Therefore, with the pump in the normal operating arrangement, isolation valve 30 does not hamper the flow of the reactor coolant but rather enhances the flow of the reactor coolant by means of turning vane 32 cooperating with discharge diffuser 28. However, when it is necessary to isolate pump 10 from the remainder of the reactor coolant system, valve cylinder 34 may be slid downwardly with respect to diffuser support cylinder 40 and into a position as shown in FIG. 5. When in the position as shown in FIG. 5, piston ring 42 is in contact with discharge valve seat 48 and creates a low leakage path therebetween. Also when in this position, labyrinth seal insert 52 is in close proximity with piston ring seat 46 also creating a low leakage path therebetween. As can be seen from FIG. 5, when in this position, isolation valve 30 essentially isolates pump 10 from the remainder of the reactor coolant system and thereby prevents flow through pump 10.

Figure 6:
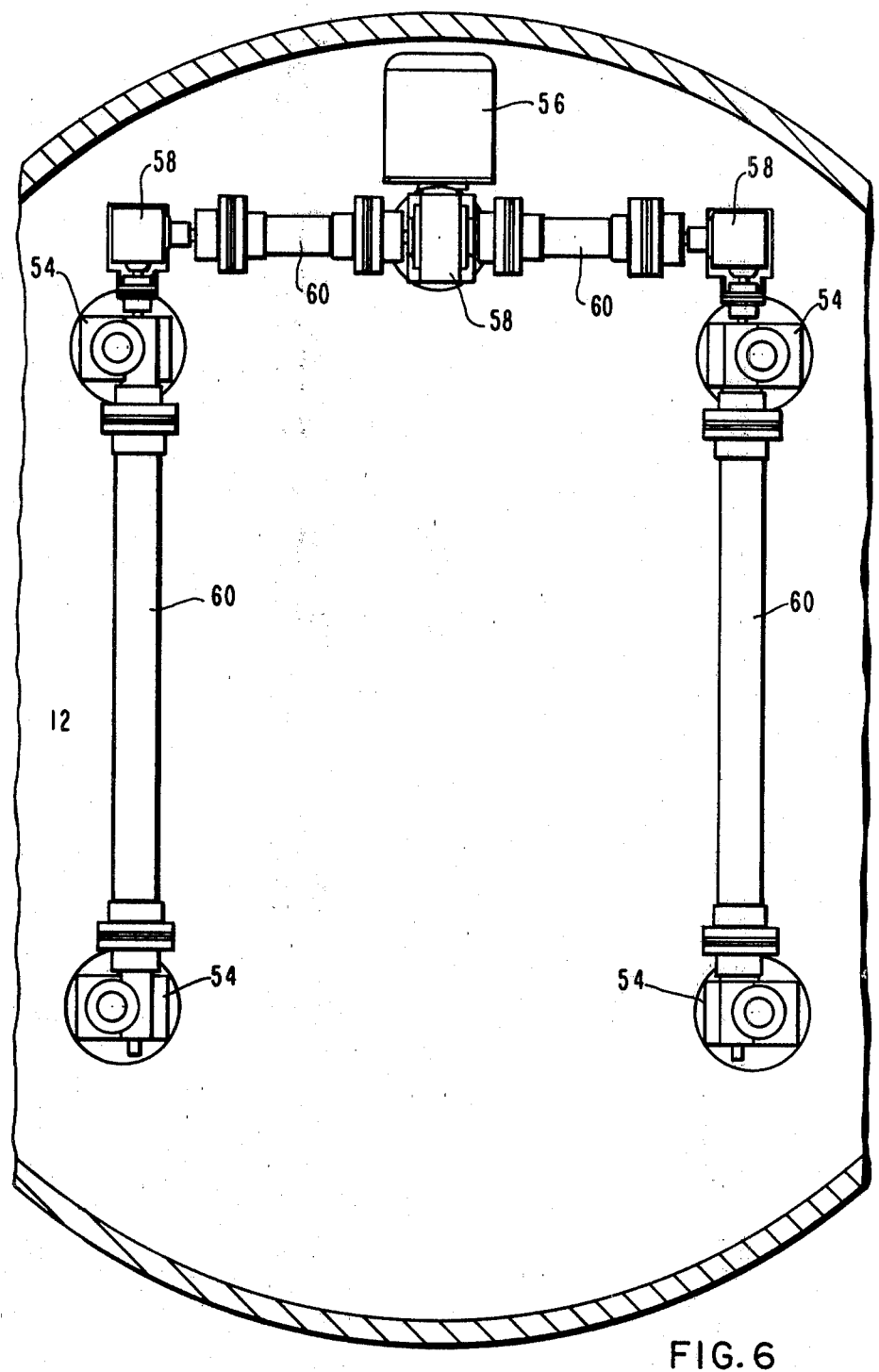
FIG. 6 is a top view of the drive mechanism.

Referring now to FIG. 6, each lifting rod 36 is attached to a jacking mechanism 54 which is mounted on top of pump section 12 inside motor stand 16. Since there are normally four lifting rods 36 attached to each lifting rod bracket 38, there are provided four jacking mechanisms 54. Each jacking mechanism may be a machine screw jack that cooperates with a worm gear on each lifting rod 36 so as to raise or lower lifting rod 36 when the jacking mechanism 54 is activated. A small gear motor 56 which may be 3.0 hp is also disposed on pump section 12 and is connected to each jacking mechanism 54 by means of gear boxes 58 and drive lines 60. In this manner, when motor 56 is activated, each jacking mechanism 54 is simultaneously activated. Thus, each lifting rod 36 can be raised or lowered simultaneously by activating motor 56.

The pump isolation valve provides a unique flow shut-off device that serves two purposes in a most effective way. In the open position, it serves as a fluid diffuser by directing the high pressure fluid in the final stages of discharge. In the closed position, the valve serves to restrict flow in either direction. In summary, the pump isolation valve will provide the following advantages and functions:

1. It isolates the pump from the overall reactor coolant system;
2. It prevents reverse flow through the isolated pump;
3. It permits operation of the reactor plant at part load without fluid pressure loss associated with reverse flow through an idle pump;
4. The valve is removable with the pump internals for maintenance purposes;
5. In the open position, the valve is completely withdrawn from the pump discharge flow path avoiding potential vibration, fluid pressure drop, cavitation, and erosion damage;
6. In the open position, it serves as part of the discharge diffuser turning vane; and
7. It is easily controlled by motor driven operator located external to the pump hydraulics.

We claim as our invention:

1. A pump having an isolation valve comprising:
   a diffuser support cylinder attached to the discharge diffuser of said pump;
   a valve cylinder slidably mounted on said diffuser support cylinder and extending substantially entirely around the outside thereof for preventing flow from said pump when said valve cylinder is in a closed position;
   a plurality of keys attached to said diffuser support cylinder and slidably disposed in keyways in said valve cylinder for maintaining alignment between said valve cylinder and said diffuser support cylinder;
   a turning vane mounted on an end of said valve cylinder and shaped to conform to the outlet configuration of said discharge diffuser and arranged to abut said discharge diffuser when said valve cylinder is in open position for directing the flow of fluid from said discharge diffuser; and
   drive means mounted on said pump and attached to said valve cylinder for selectively sliding said valve cylinder relative to said diffuser support cylinder thereby opening and closing said isolation valve.

2. The pump according to claim 1 wherein said isolation valve further comprises a piston ring seal mounted on said valve cylinder for establishing a seal between said valve cylinder and said discharge diffuser.

3. The pump according to claim 2 wherein said isolation valve further comprises a labyrinth seal insert mounted on said valve cylinder for establishing a seal between said valve cylinder and said diffuser support cylinder.

4. The pump according to claim 3 wherein said drive means comprises:
   a lifting rod attached to said valve cylinder for sliding said valve cylinder relative to said diffuser support cylinder; and
   a drive mechanism mounted on said pump and connected to said lifting rod for moving said lifting rod.

5. The pump according to claim 4 wherein said drive mechanism comprises:
   a jacking mechanism mounted on said pump and connected to said lifting rod for moving said lifting rod; and
   a motor mounted on said pump and connected to said jacking mechanism for activating said jacking mechanism.

* * * * *